(12) United States Patent
Kirt et al.

(10) Patent No.: US 9,022,315 B2
(45) Date of Patent: May 5, 2015

(54) WIND TURBINE GENERATOR INSTALLATION BY AIRSHIP

(75) Inventors: Rune Kirt, Copenhagen East (DK); Mads Bækgaard Thomsen, Copenhagen N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 495 days.

(21) Appl. No.: 13/377,380

(22) PCT Filed: Jun. 15, 2010

(86) PCT No.: PCT/DK2010/050142
§ 371 (c)(1),
(2), (4) Date: Dec. 9, 2011

(87) PCT Pub. No.: WO2010/145665
PCT Pub. Date: Dec. 23, 2010

(65) Prior Publication Data
US 2012/0091274 A1   Apr. 19, 2012

Related U.S. Application Data

(60) Provisional application No. 61/187,065, filed on Jun. 15, 2009.

(30) Foreign Application Priority Data

Jun. 30, 2009   (EP) ..................................... 09164207

(51) Int. Cl.
*B64B 1/06* (2006.01)
*B64D 1/22* (2006.01)
(Continued)

(52) U.S. Cl.
CPC . *F03D 1/001* (2013.01); *B64B 1/06* (2013.01); *B64B 1/30* (2013.01); *B64D 1/22* (2013.01);
(Continued)

(58) Field of Classification Search
CPC ............. B64B 1/06; B64D 1/22; E04H 12/34
USPC .............................................. 244/30, 31, 127
See application file for complete search history.

(56) References Cited

U.S. PATENT DOCUMENTS 3,116,037 A * 12/1963 Yost ................................ 244/31
4,055,316 A 10/1977 Chipper et al.
(Continued)

FOREIGN PATENT DOCUMENTS

DE       29720711 U1   1/1998
DE    102007043426 A1   3/2009
(Continued)

OTHER PUBLICATIONS

The International Bureau of WIPO, International Preliminary Report on Patentability issued in priority International Application No. PCT/DK2010/050142; Dec. 16, 2011, 8 pages.
(Continued)

*Primary Examiner* — Tien Dinh
*Assistant Examiner* — Richard R Green
(74) *Attorney, Agent, or Firm* — Wood, Herron & Evans, LLP

(57) ABSTRACT

The invention relates to a method for handling at least one wind turbine generator component 104, 106, 108. The method comprises the steps of loading said at least one wind turbine generator component 104, 106, 108 to an airship 100 at a site of loading, transporting the airship 100 with the at least one wind turbine generator component from the site of loading of the at least one wind turbine generator component to the site of installation of the at least one wind turbine component, and unloading said at least one wind turbine generator component from the airship at the site of unloading by means one or more guide elements 150 extending between the at least one wind turbine generator component and another wind turbine generator component or the ground, the sea, a vehicle at the ground, or at a vessel at the sea. The invention also relates to use of an airship for installing wind turbine generator components.

8 Claims, 15 Drawing Sheets

(51) Int. Cl.
  *F03D 1/00* (2006.01)
  *B64B 1/30* (2006.01)
  *E04H 12/34* (2006.01)

(52) U.S. Cl.
  CPC ............ *E04H 12/34* (2013.01); *F05B 2230/50* (2013.01); *F05B 2230/604* (2013.01); *F05B 2230/61* (2013.01); *Y02E 10/728* (2013.01)

(56) References Cited

U.S. PATENT DOCUMENTS

| | | | |
|---|---|---|---|
| 6,231,007 B1 * | 5/2001 | Schafer | 244/127 |
| 2002/0109045 A1 * | 8/2002 | Beach et al. | 244/33 |
| 2007/0102571 A1 * | 5/2007 | Colting | 244/30 |
| 2009/0072078 A1 * | 3/2009 | Choi et al. | 244/30 |
| 2009/0078818 A1 * | 3/2009 | Zulkowski et al. | 244/30 |
| 2009/0134268 A1 * | 5/2009 | Kulesha | 244/2 |
| 2009/0152391 A1 * | 6/2009 | McWhirk | 244/30 |
| 2010/0012771 A1 * | 1/2010 | Jess | 244/29 |
| 2010/0288872 A1 * | 11/2010 | Wiley | 244/33 |
| 2011/0057158 A1 * | 3/2011 | Von Kessel et al. | 254/323 |
| 2011/0116905 A1 * | 5/2011 | Von Kessel et al. | 414/800 |
| 2011/0192938 A1 * | 8/2011 | DiMarzio et al. | 244/53 R |

FOREIGN PATENT DOCUMENTS

| | | |
|---|---|---|
| EP | 0054508 A1 | 6/1982 |
| WO | 2006010783 A1 | 2/2006 |
| WO | 2008084971 A1 | 7/2008 |

OTHER PUBLICATIONS

European Patent Office, International Search Report and Written Opinion issued in related International application No. PCT/DK2010/050142 dated Sep. 6, 2010.

European Patent Office, Search Report issued in related European Application No. EP 09 16 4207 dated Jan. 18, 2010.

* cited by examiner

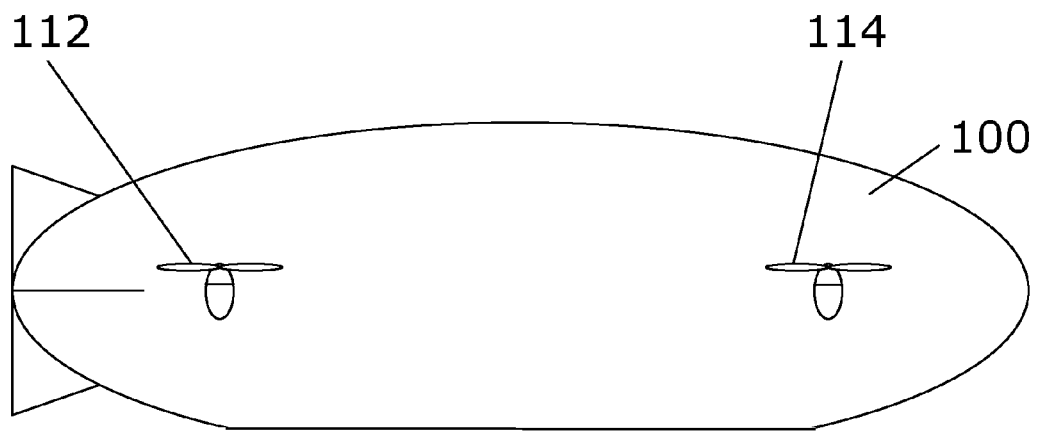
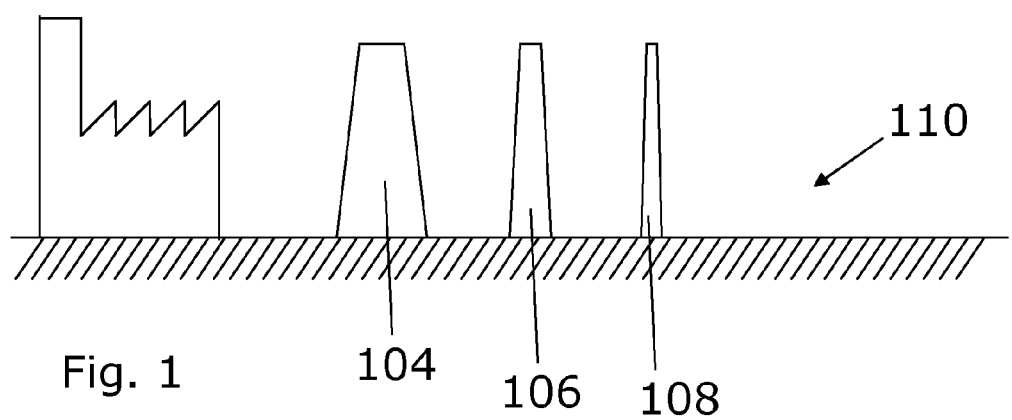
Fig. 1

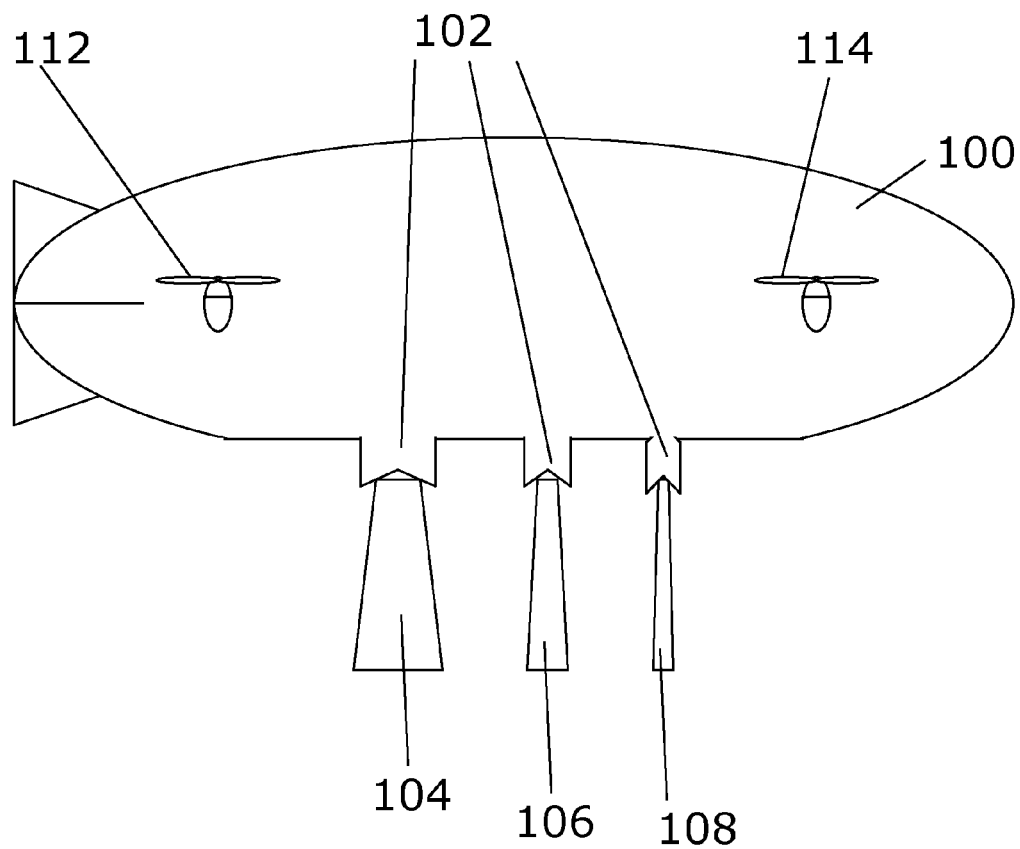
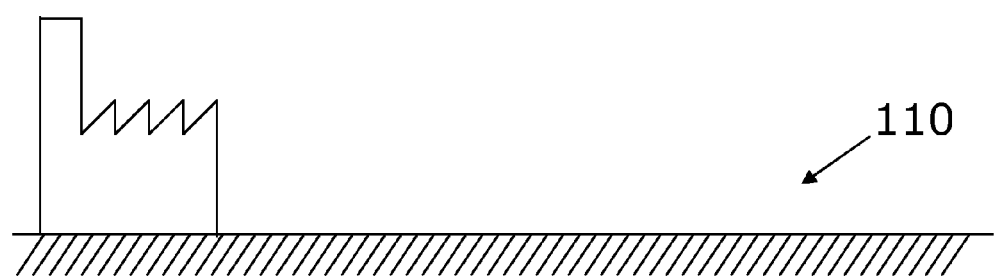
Fig. 4

WIND TURBINE GENERATOR INSTALLATION BY AIRSHIP

FIELD OF THE INVENTION

The invention relates to a method for handling pieces of equipment for installing a wind turbine generator, and in particular to a method for handling one or more wind turbine generator components. The invention also relates to an airship and to use of such airship.

BACKGROUND OF THE INVENTION

The inventor of the present invention has appreciated that an improved method of handling pieces of equipment for installing a wind turbine generator is of benefit, and has in consequence devised the present invention.

Installing a wind turbine generator comprises different pieces of equipment and different steps of transportation. The pieces of equipment can be wind turbine generator components themselves including sub stations for supplying the electrical energy to a grid, or the pieces of equipment can be equipment associated with installing a wind turbine generator such as mobile cranes or other installation equipment needed at a site of installation or at another site.

Cranes are widely used for installation of wind turbine generators, either land-based mobile cranes or stationary cranes, or sea-based barge cranes, or even air-borne helicopters used as cranes. Vehicles or vessels are also used for installation of wind turbine generators, including trucks, trains, ships and aircrafts, namely for transporting pieces of equipment from a site of loading to a site of unloading.

Common to the different vessels and vehicles used for installation of a wind turbine generator is that the vessels or vehicles often are very expensive to use and/or require roads, harbours, airports, or railway stations for loading and unloading the pieces of equipment and/or require sufficiently wide and stable roads or railways between the site of loading and the site of unloading.

SUMMARY OF THE INVENTION

It may be seen as an object of the present invention to provide an improved method for handling pieces of equipment for installing a wind turbine generator. Such pieces of equipment are e.g. wind turbine generator components.

The objects and advantages of the invention may be obtained by a method for handling at least one wind turbine generator component, said method comprising the steps of
loading said at least one wind turbine generator component to an airship at a site of loading, said site of loading being different from a site of installation of the wind turbine generator component,
transporting the airship with the at least one wind turbine component from the site of loading of the at least one wind turbine generator component to the site of installation of the at least one wind turbine component, and
unloading said at least one wind turbine generator component from the airship at the site of unloading by installing said at least one wind turbine generator component at another wind turbine generator component or at the ground, the sea, a vehicle at the ground, or a vessel at the sea by means of one or more guide elements extending between the at least one wind turbine generator component and the other wind turbine generator component or at the ground, the sea, a vehicle at the ground, or a vessel at the sea.

Unloading said at least one wind turbine generator component from the airship by means of one or more guide elements extending between the at least one wind turbine generator component and the other wind turbine generator component may have the advantage of providing easy and safe means of unloading, said unloading being guided, thus limiting the risk of damages to the components as well as to other equipment and personnel.

A method according to a possible aspect of the invention further comprises the step of initially selecting the at least one wind turbine generator component from the group consisting of the following components: a wind turbine blade, a wind turbine tower section, a complete wind turbine tower, a wind turbine nacelle, a wind turbine hub, a wind turbine foundation, a generator, a wind turbine gear box, a wind turbine transformer, a wind turbine rectifier, a wind turbine inverter, or a wind turbine bunny comprised of the hub and two wind turbine blades extending obliquely upwards.

Another method according to a possible aspect of the invention further comprises the step of initially selecting the other wind turbine generator component from the group consisting of the following components: a wind turbine blade, a wind turbine tower section, a complete wind turbine tower, a wind turbine nacelle, a wind turbine hub, a wind turbine foundation, a generator, a wind turbine gear box, a wind turbine transformer, a wind turbine rectifier, a wind turbine inverter, a wind turbine bunny comprised of the hub and two wind turbine blades extending obliquely upwards, or a foundation.

According to a possible aspect of the invention, the method further comprises the step of:
connecting the one or more guide elements to the airship while extending therefrom,
connecting the one or more guide elements to the at least one wind turbine generator one component while extending therefrom, and
connecting the one or more guide elements to the other wind turbine generator component or the ground, the sea, a vehicle at the ground, or a vessel at the sea while extending therefrom.

The guide elements extending from the airship further to the one wind turbine generator component and further to the other wind turbine generator component may have the advantage of the one or same guide element constituting both a guide element between the airship and the other wind turbine generator component and a guide element between the one and the other wind turbine generator component.

A method according to a possible aspect of the invention, further comprises the steps of:
extending the one or more guide elements from a bottom of the airship,
further extending the one or more guide elements to a top of the one wind turbine generator component,
even further extending the one or more guide elements to a bottom of the one wind turbine generator component, and
still further extending the one or more guide elements to the other wind turbine generator component or the ground, the sea, a vehicle at the ground, or a vessel at the sea while extending therefrom.

The guide elements extending from the airship as described above may have the advantage of the one or same guide element constituting both a guide element between the airship and the other wind turbine generator component and a guide element between the one and the other wind turbine generator component and the advantage of providing a safe guiding of the one wind turbine generator component in relation both to the airship and to the other wind turbine generator component.

A method according to a possible aspect of the invention where there are more guide elements comprising a first set of guide elements and a second set of guide elements, further comprises the steps of:
- connecting said first set of guide elements to the one wind turbine generator component while extending therefrom,
- connecting said first set of guide elements to the other wind turbine generator component or the ground, the sea, a vehicle at the ground, or a vessel at the sea while extending thereto,—connecting said second set of guide elements to the airship while extending therefrom, and
- connecting said second set of guide elements to the other wind turbine generator component or the ground, the sea, a vehicle at the ground, or a vessel at the sea while extending thereto.

Dividing the guide elements into a first set and a second set of guide elements may have the advantage of the first set being handled for steady guiding of the airship in relation to the other wind turbine generator component, and the second set being handled for steady guiding of the one wind turbine generator component also in relation to the other wind turbine generator component.

A method according to a possible aspect of the invention, where there are more guide elements comprising a first set of guide elements and a second set of guide elements, further comprises the steps of:
- connecting said first set of guide elements to the one wind turbine generator component while extending therefrom,
- connecting said first set of guide elements to the another wind turbine generator component while extending thereto,
- connecting said second set of guide elements to the airship while extending therefrom, and
- connecting said second set of guide elements to the ground while extending thereto.

Dividing the guide elements into such a first set and a second set of guide elements may have the advantage of the first set being handled for steady guiding of the airship in relation to the ground, and the second set being handled for steady guiding of the one wind turbine generator component in relation to the other wind turbine generator component.

A method according to a possible aspect of the invention where there are more guide elements comprising a first set of guide elements and a second set of guide elements, further comprises the steps of:
- connecting said first set of guide elements to the at least one wind turbine generator component while extending therefrom,
- connecting said first set of guide elements to the other wind turbine generator component while extending therefrom,
- connecting said second set of guide elements to the airship while extending therefrom, and
- connecting said second set of guide elements to a sea-vessel while extending thereto.

Dividing the guide elements into such a first set and a second set of guide elements may have the advantage of the first set being handled for steady guiding of the airship in relation to the sea-vessel, and the second set being handled for steady guiding of the one wind turbine generator component in relation to the other wind turbine generator component.

According to a possible aspect of the invention, the method further comprises the steps of initially unloading and installing one wind turbine tower section and subsequently guiding, by means of the one or more guide elements, another wind turbine tower section for being positioned in relation to and for being installed on the one wind turbine tower section.

Using guide element for installation of one wind turbine tower section on another wind turbine tower section may have the advantage of the one wind turbine tower section being guided steadily, safely and easily, even if the airship is not steadily situated in the air.

A method according to a possible aspect of the invention further comprises the step of selecting the one or more guide elements from the group consisting of: one or more flexible ropes, one or more elastic ropes, one or more chains, one or more wires, or one or more rigid rods.

One or more flexible ropes, one or more elastic ropes, one or more chains, one or more wires, or one or more rigid rods used for the guide element may have the advantage of possible flexibility, both upwards and downwards and laterally of the guide elements, thus taking up any non-steadiness of the airship in the air.

According to a possible aspect of the invention, the one or more guide elements extend from or through eyelets provided at the airship and/or at the one wind turbine generator component and/or at the other wind turbine generator component and/or at the ground and/or at the sea-vessel.

Eyelets for the guide elements may have the advantage of easy and safe fastening of the guide elements to the airship and/or to the one wind turbine generator component and/or to the other wind turbine generator component and/or to the ground and/or to a sea-vessel.

According to a possible aspect of the invention, a free end of at least one of the one or more guide elements is connected to a traction equipment, and traction in the free end of the at least one guide element results in a pulling downwards of the one wind turbine generator component from the airship towards the other wind turbine generator component or the ground, the sea, a vehicle at the ground, or a vessel at the sea.

Connecting a free end of at least one of the one or more guide elements to a traction equipment for pulling downwards of the one wind turbine generator component from the airship towards the other wind turbine generator component may have the advantage of controlling guiding of the one wind turbine generator component in relation to the other wind turbine generator component by other means than moving the airship downwards and/or laterally.

According to a possible aspect of the invention, the step of unloading said at least one wind turbine generator component from the airship at the site of unloading is performed by the airship being lowered towards the ground or sea at a position for unloading the at least one wind turbine generator component, and by the at least one wind turbine component being detached from the airship when the airship is in the lowered position above the ground or sea without hoisting the wind turbine generator component from the airship.

The airship being lowered towards the ground or sea at a position for unloading the wind turbine generator component may have the advantage of controlling guiding of the one wind turbine generator component in relation to the other wind turbine generator component by moving the airship downwards.

According to a possible aspect of the invention, the airship is lowered towards the ground or sea at a position for unloading the at least one wind turbine generator component by a traction force being applied to a free end of at least one of the one or more guide elements.

Connecting a free end of at least one of the one or more guide elements to a traction equipment for pulling downwards the airship towards the ground or the sea may have the advantage of controlling guiding of the one wind turbine generator component in relation to the other wind turbine generator component by other means than moving the airship downwards and/or laterally only by using moving equipment of the airship.

According to a possible aspect of the invention, the step of unloading said at least one wind turbine generator component from the airship at the site of unloading is performed by the airship being positioned above the ground or sea at a position for unloading the at least one wind turbine generator component, and by the at least one wind turbine component being detached from the airship when the airship is in the position above the ground or sea by hoisting the at least one wind turbine generator component from the airship.

According to a possible aspect of the invention, the at least one wind turbine component is detached from the airship when the airship is in the position above the ground or sea by a releasing of a previously applied traction force being applied to a free end of at least one of the one or more guide elements.

Connecting a free end of at least one of the one or more guide elements to a traction equipment for lowering downwards the at least one wind turbine generator component from the airship towards the other wind turbine generator component, by releasing the traction force, may have the advantage of controlling guiding of the one wind turbine generator component in relation to the other wind turbine generator component by other means than moving the airship downwards and/or laterally.

The objects and advantages of the invention may also be obtained by an airship for handling at least one wind turbine generator component, said airship being provided with one or more guide elements extending from and being connected to the airship, where at least one of the one or more guide elements extend from the airship to a wind turbine generator component, and where one or more guide elements extend between the at least one wind turbine generator component and another wind turbine generator component or the ground, the sea, a vehicle at the ground, or a vessel at the sea at least when the airship is ready for unloading said at least one wind turbine generator component.

According to a possible aspect of the invention,
a first set of one or more guide elements is extending from and being connected to the airship, and where at least one of the one or more guide elements extend from the airship to the wind turbine generator component, and where
a second set of one or more guide elements is extending from and being connected to the airship, and where at least one of the one or more guide elements extends from the airship to the ground or to a sea-vessel.

Dividing the guide elements into a first set and a second set of guide elements may have the advantage of the first set being handled for steady guiding of the airship in relation to the ground or a sea-vessel, and the second set being handled for steady guiding of the wind turbine generator section in relation to the other wind turbine generator component.

According to a possible aspect of the invention, the one or more guide elements is extending from and being connected to the airship, and at least one of the one or more guide elements extends from the airship to the wind turbine generator component, and said one or more guide elements is also extending from and being connected to the airship, and at least one of the one or more guide elements extends from the airship to the ground or to a sea-vessel.

The guide elements extending from the airship further to the one wind turbine generator component and further to the ground or a sea-vessel may have the advantage of the one or same guide element constituting both a guide element between the airship and the ground or sea, and a guide element between the wind turbine generator component and the other wind turbine generator component.

The objects and advantages of the invention may also be obtained by use of an airship according to the claims for installing a wind turbine generator component to an on-shore or off-shore foundation for a wind turbine generator during installation of or dismantling of a wind turbine generator.

The objects and advantages of the invention may also be obtained by use of an airship according to the claims for installing a wind turbine generator component to another wind turbine generator component during installation of or dismantling of a wind turbine generator.

The objects and advantages of the invention may also be obtained by a method for handling at least one piece of equipment for installing a wind turbine generator, said method comprising the steps of:
loading said at least one piece of equipment to an airship at a site of loading, said site of loading being different from a site of installation of the wind turbine generator,
transporting the airship with the at least one piece of equipment from the site of loading to the site of installation, and
unloading said at least one piece of equipment from the airship at the site of unloading by delivering said at least one piece of equipment at a wind turbine generator component or at the ground, the sea, a vehicle at the ground, or a vessel at the sea by means of one or more guide elements extending between the at least one piece of equipment and the wind turbine generator component or the ground, the sea, a vehicle at the ground, or a vessel at the sea.

The objects and advantages of the invention may also be obtained by an airship for handling at least one piece of equipment for installing a wind turbine generator, said airship being provided with one or more guide elements extending from and being connected to the airship, where at least one of the one or more guide elements extends from the airship to a wind turbine generator component, and where one or more guide elements extend between the at least one piece of equipment and a wind turbine generator component or the ground, the sea, a vehicle at the ground, or a vessel at the sea at least when the airship is ready for unloading said at least one piece of equipment.

The objects and advantages of the invention may also be obtained by a method for handling at least one wind turbine generator component, said method comprising the steps of:
extending one or more guide elements between a site of loading a wind turbine generator component and a site of installation of a wind turbine generator component, said site of loading being different from a site of installation of the wind turbine generator component,
suspending said one or more guide elements, between the site of loading and the site of installation of the wind turbine generator component, by a lighter-than-air vessel,
loading said at least one wind turbine generator component to the one or more guide elements at a site of loading,
transporting the at least one wind turbine component along the one or more guide elements from the site of loading of the at least one wind turbine generator component to the site of installation of the at least one wind turbine component, and unloading said at least one wind turbine generator component from the one or more guide elements at the site of unloading by installing said at least one wind turbine generator component at another wind turbine generator component or at the ground, the sea, a vehicle at the ground, or a vessel at the sea by means of the one or more guide elements extending between the at least one wind turbine generator component and the other wind turbine generator component or the ground, the sea, a vehicle at the ground, or a vessel at the sea.

By such a method it will be possible to move a number of wind turbine generator components e.g. over a certain distance of open water without having to use any other means of transportation than e.g. a pulley and wire system. The advantages will be further envisaged from the description of FIGS. 9-11 below.

The lighter-than-air vessel may be moved along the one or more guide elements together with the at least one wind turbine generator component. An advantage of such a method may be that the wind turbine component can be lifted directly by the lighter-than-air vessel, which may give a more stable transportation especially over long distances or in windy areas.

Different applications and uses in accordance with the present invention include:

Using an airship for lifting components in wind where the wind on a windy site is used by a specially made and designed airship or auxiliary lifting balloon which may generate enough buoyancy to lift wind turbine generator parts from the ground to the desired elevated positions during the installation;

using an airship for laying an electrical cable from the airship, either a ground cable or more preferably an off-shore cable;

using an airship for working as a heavy duty crane on the site of installation;

using a specialised airship to transport and install the nacelle onto the towers;

using an airship to place tower or tower sections on the desired foundation by transporting them vertically during parts of the transport or during the entire transport;

using an airship used as a combination of a lifting means, e.g. crane, and a transportation means to install an off-shore wind turbine generator by transporting a wind turbine generator, which is assembled on-shore prior to transportation, in a completely, or almost completely, assembled condition to the off-shore site of installation;

using one or more airships as auxiliary lifting balloons being applied during the installation, for example to circumvent the use of a crane;

using helicopters for pulling and/or manipulating the auxiliary lifting balloons; erecting full wind turbine generator off-shore, which is particularly advantageous for reducing cost of installation at far and remote sites, e.g., on the sea;

using an airship for pulling or dragging off-shore foundations to the site of installation;

using an airship for bringing accommodations, workshops (incl. light working equipments), offices etc. to the site of installation;

using an airship to carry a fuel tank to refuel working equipment, for example for refueling with gas, hydrogen or electricity;

using an airship for bulk carrying where the present invention, in addition to carrying large parts and elements of a wind turbine generator, is applied for transporting raw materials, semi-manufactured elements, or large tools, e.g. blade moulds, to sites of production or manufacturing;

using an airship for transporting blade moulds to local site factories; using an airship for transporting larger components for production of larger tower flanges that could help save steel for the towers;

using an airship for transporting of raw large materials for production (larger steel plates);

using an airship for transporting from a barge, to a ship and further to an airship, where pre-assembled parts, for example the nacelle, hub, and rotors may assembled on the point of installation, may be transported to a site of installation;

using an airship for transporting prefabricated crane pads to and around the site by an airship, an advantage being to decrease time on site and cost for the costumer;

using an airship for transporting prefabricated foundations by an airship, which could decrease erection time and cost;

using an airship to transport and deploy a met-mast, or alternatively the airship may function as a met-mast, for example by anchoring the airship to a desired position and height.

using an airship to reach today's almost completely unreachable possible sites of installation, e.g. in Mongolia, in Peru etc.

When referring to an advantage, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any possible way within the scope of the invention.

Airships for performing one or more of the methods according to the invention may be specifically developed for performing the one or more methods.

However, hereby incorporated by reference are already developed, existing or projected airships from one or more of the following developers and manufacturers of airships: Skycat/Hybrid Air Vehicles, Skyhook International, Lockheed Martin, RosAeroSystems, 21st Century Airships, Airship.org, all of which are suited for performing one or more of the methods according to the invention.

These and other aspects, features and/or advantages of the invention will be apparent from and elucidated with reference to the description hereinafter.

BRIEF DESCRIPTION OF THE FIGURES

The method steps and the use and the airship according to the invention will now be described in more detail with regard to the accompanying figures. The figures show one way of implementing the present invention and is not to be construed as being limiting to other possible embodiments falling within the scope of the attached claim set.

FIGS. 1-4 schematically show method steps and uses of an airship for handling wind turbine generator components according to an overall installation concept of the invention. Such components are exemplified by wind turbine tower sections.

DETAILED DESCRIPTION OF AN EMBODIMENT

In the following figures the invention will be described with reference to transportation and installation of wind turbine tower sections for raising a wind turbine tower for a wind turbine generator. The wind turbine tower is shown as consisting of three sections for illustrative purposes only. Other wind turbine generator components than wind turbine tower sections, e.g. blades, a nacelle, or a hub, may be transported and installed by the method described.

Any number of sections is possible within the scope of the invention, and as described above, the present invention can be used for handling and transporting a range of pieces of equipment for installing a wind turbine generator, either equipment being components of the wind turbine tower itself, or equipment such as substations and the like for delivering electrical power from the wind turbine generator, or equipment such as cranes and the like for installing or servicing the wind turbine generator.

FIG. 1 shows schematically three towers sections 104, 106, 108 at a site of manufacturing (symbolized by a factory building) and an airship 100 ready to load the tower sections 104, 106, 108. The tower sections 104, 106, 108 are shown in an upright orientation, preferably a vertical orientation, but any orientation, such as horizontal, is also covered by the scope of the present invention.

Figure 2:
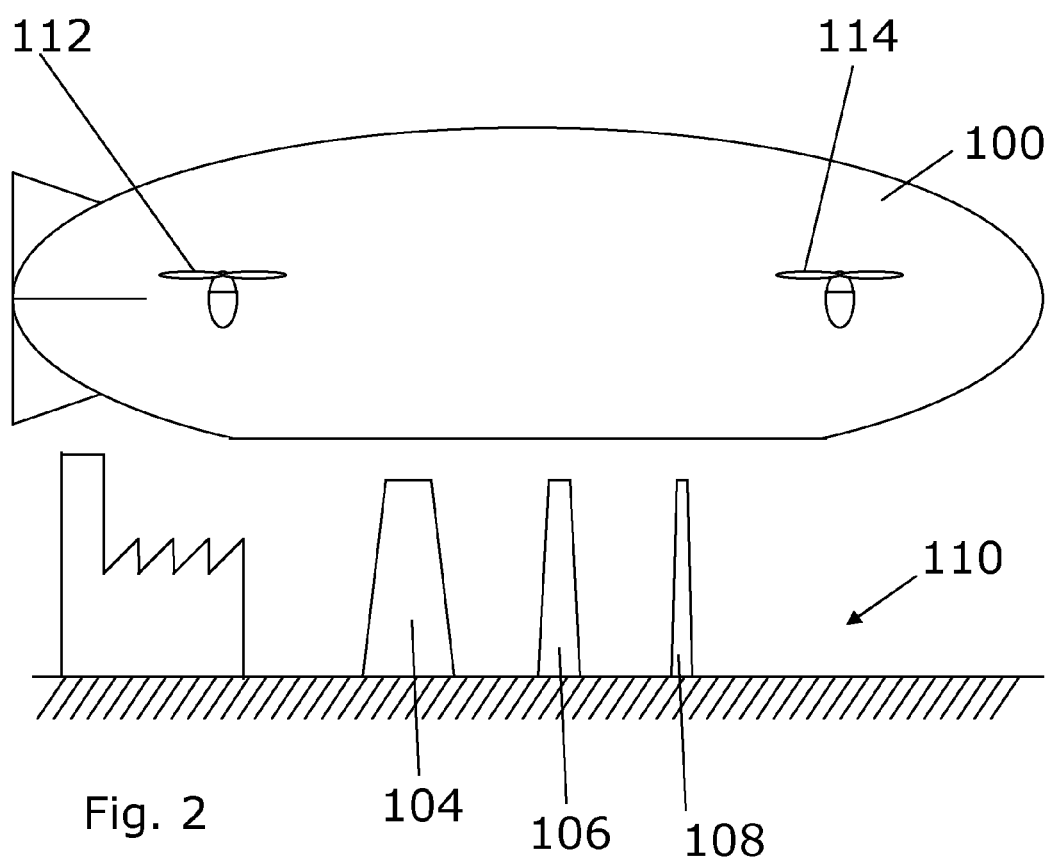

The site of manufacturing is just one example of a site of loading 110. It could alternatively be e.g. another ground site, a truck or a sea-vessel, if the tower sections are transported part of the way by other means of transportation than an airship. The airship 100 has propellers 112, 114 for controlling the position of the airship. FIG. 2 shows the airship 100 lowered to a position above the tower sections 104, 106, 108 ready for being loaded onto the airship 100.

Figure 3:
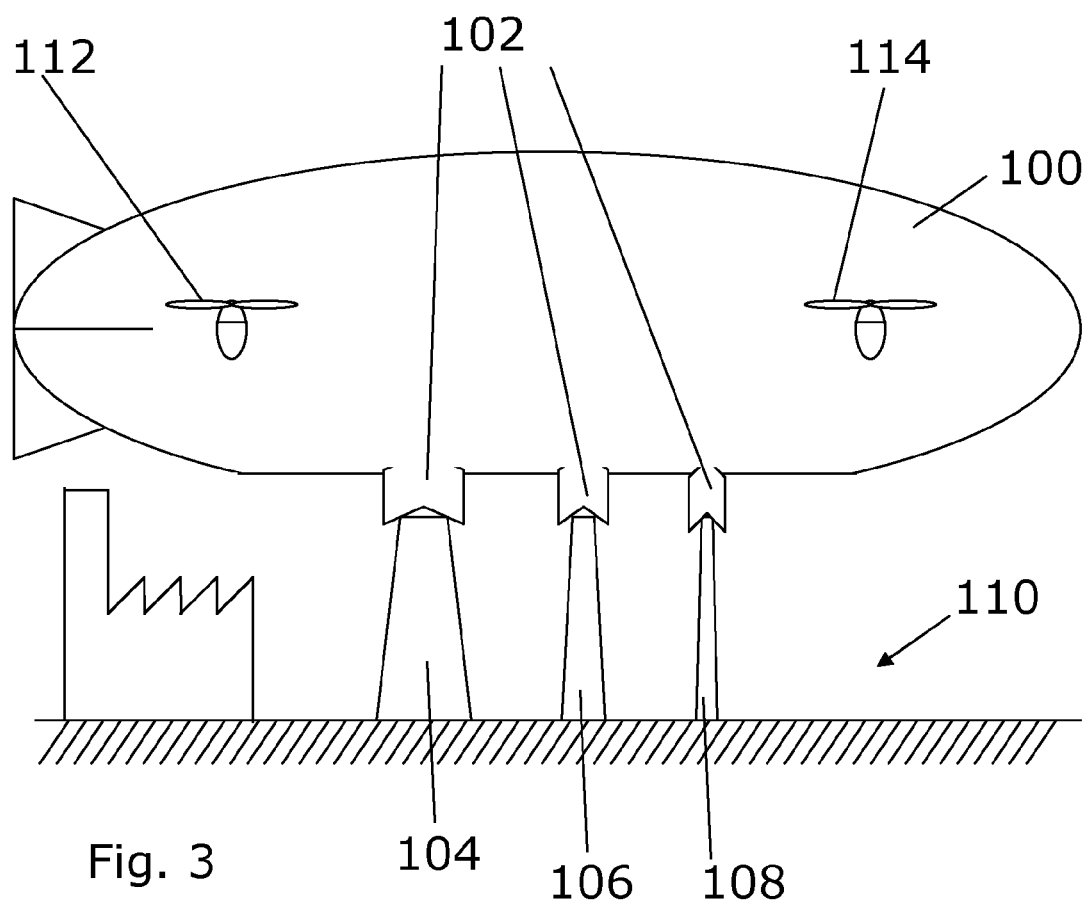

FIG. 3 shows schematically the airship 100 comprising cargo attachment elements 102 adapted to receive the wind turbine tower sections 104, 106, 108. The cargo attachment elements 102 are shown having three different sizes corresponding to the different sizes of the wind turbine tower sections 104, 106, 108. In practice the cargo attachment elements 102 may be identical, but adjustable, to match and securely hold different sizes and shapes of cargo, such as wind turbine tower sections or other pieces of equipment for installing or servicing a wind turbine generator component.

FIG. 4 shows the airship 100 displaced upwards and with the wind turbine tower sections 104, 106, 108 being suspended below the airship 100. If desired, the airship 100 may also be designed so that the cargo is partially or fully enclosed inside the airship 100 during transportation. Hereby, the cargo is better protected and the aerodynamic properties of the airship may be improved. Partially or fully enclosing the wind turbine tower sections 104, 106, 108 inside the airship 100 during transportation can be particularly important if the transportation is over long distances and/or at high speeds. On the other hand, enclosing cargo inside the air ship 100 may result in a need for more complex cargo holds 102 and larger outer dimensions of the airship 100.

Figure 5:
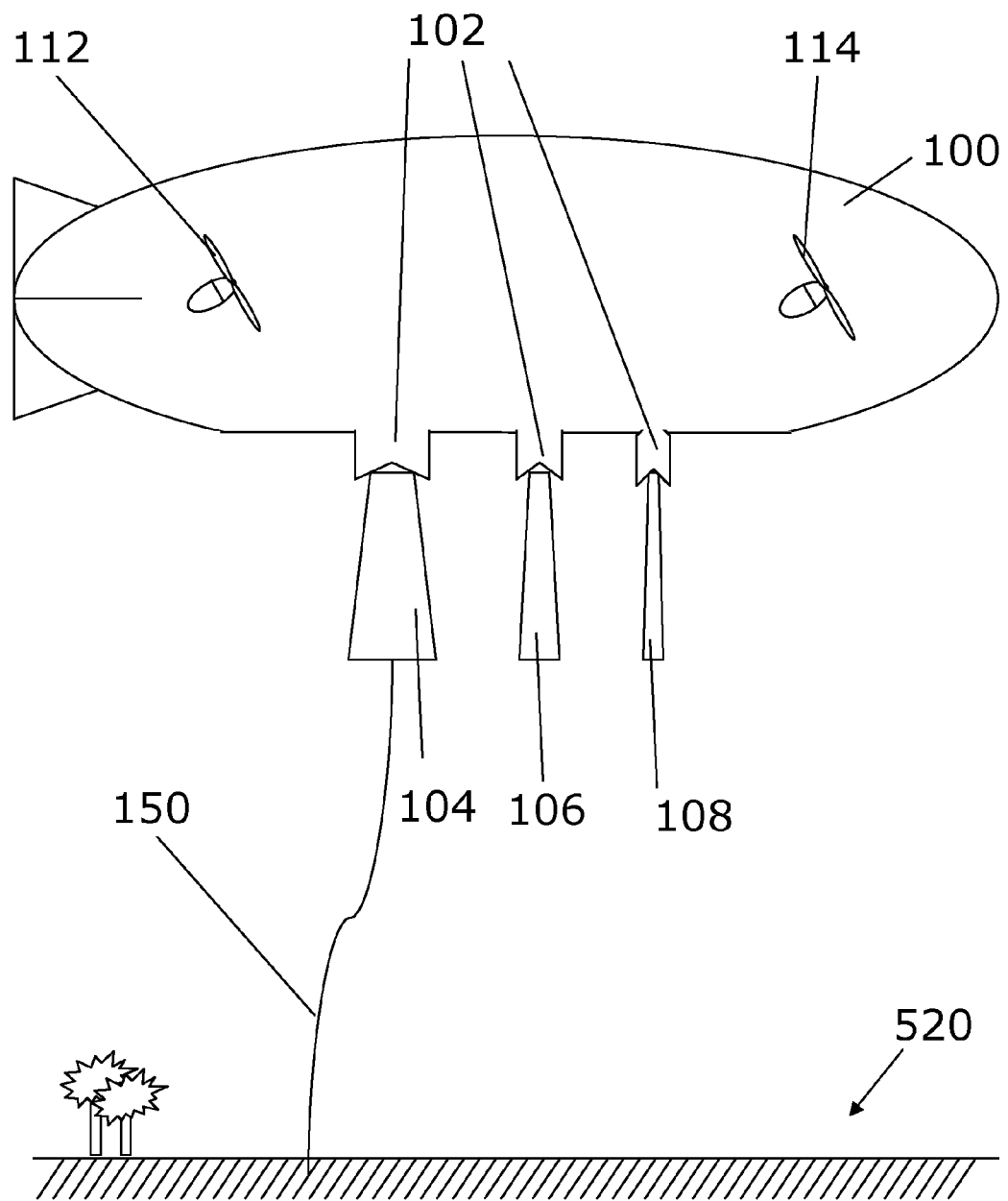
FIGS. 5-8 schematically show method steps and uses comprising use of one or more guide elements.

FIG. 5 shows the airship 100 after having transported the wind turbine tower sections 104, 106, 108 to a site of unloading 520 (symbolized by a couple of trees), in the present case at a site of installation of a wind turbine generator.

A guide element 150 extends from the first tower section 104 to the ground 520 where it is typically fastened e.g. to a temporary anchoring (not shown). The guide element 150 is intended for guiding the first tower section 104 from the airship 100 to the ground 520. The guide element 150 may be a flexible guide element 150 such as a wire, a rope, a chain or the like, or the guide element 150 may be a rigid element such as a rod or a lattice structure. The guide element 150 may extend from or through eyelets (not shown) provided at the airship 100 and/or at the one wind turbine generator component 104, 106, 108 and/or at the other wind turbine generator component and/or at the ground 520 and/or at the sea-vessel (not shown). Hereby an easy and safe handling can be ensured. However, any means of fastening and guiding of the guide elements 150 are considered to be covered by the present invention. Such means will be well-known to a person skilled in the art.

In the embodiment shown, the guide element 150 is shown being non-stretched.

However, when the first tower section 104 is to be lowered from the airship 100 to the ground 520, the guide element 150 may be stretched, possibly by the airship 100 flying upwards. The largest tower section 104 is intended as a bottom tower section of a wind turbine generator tower. Thus, the guide element 150 extends from the first and bottom tower section 104 to the ground, preferably to a foundation at the ground, for the wind turbine generator to be installed.

Figure 6:
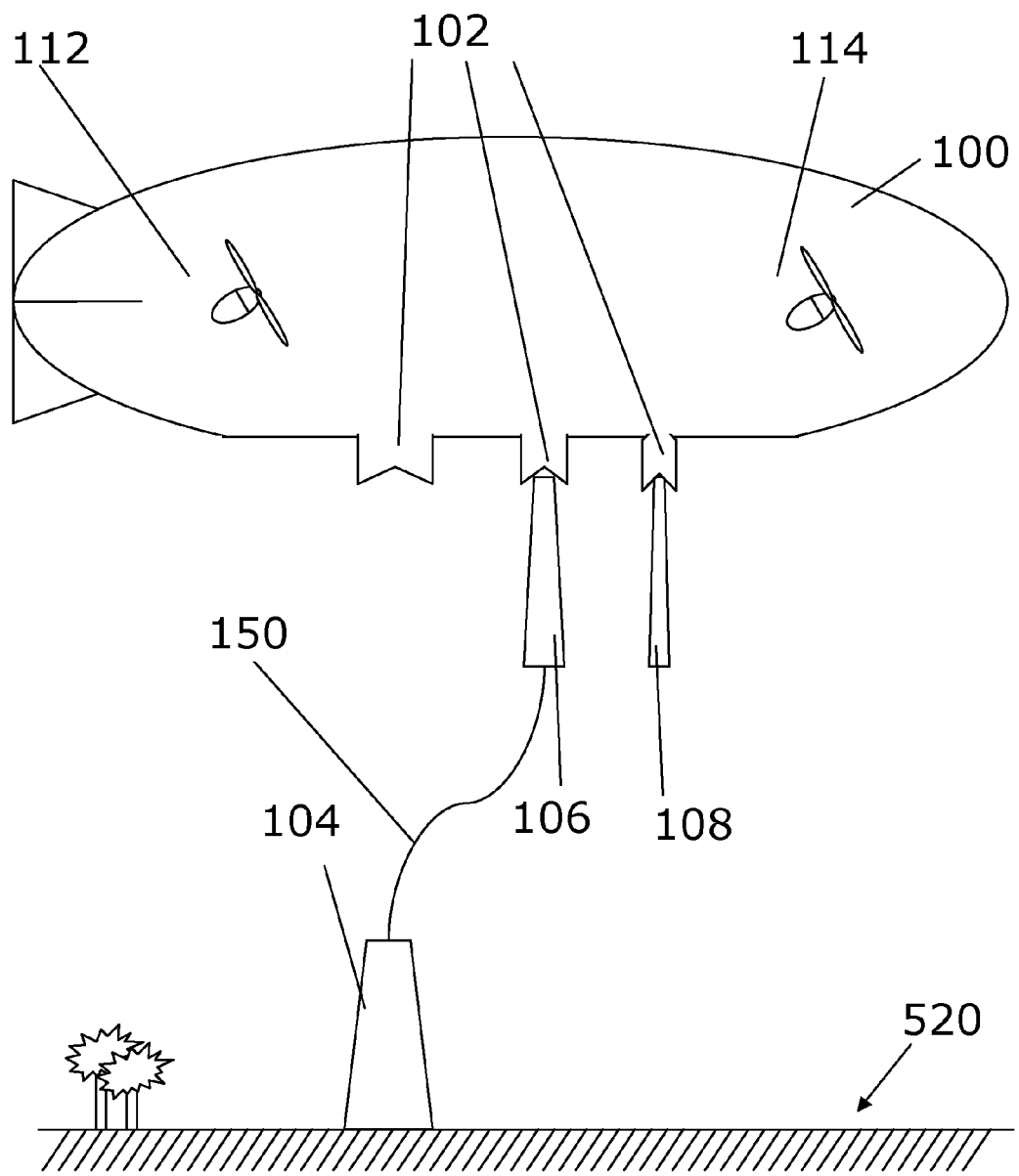

FIG. 6 shows the airship 100 after having unloaded the first tower section 104 at the site of installation and still having the other tower sections 106, 108 suspended in the attachment elements 102.

A guide element 150 extends from the second tower section 106 to the first tower section 104 already installed at the site. The guide element 150 shown in FIG. 6 may be the same guide element 150 as shown in FIG. 5, with FIG. 6 just showing another extension of the guide element 150, namely an extension between the first bottom tower section 104 and the second intermediate tower section 106. Alternatively, the guide element 150 shown in FIG. 6 may be a separate guide element 150 that is similar to the guide element 150 in FIG. 5.

In either embodiment, the guide element 150 is intended for guiding the second tower section 106 from the airship 100 to the first tower section 104. The guide element 150 may be a flexible guide element 150 such as a wire, a rope, a chain or the like, or the guide element 150 may be a rigid element such as a rod or a lattice structure.

In the embodiment shown, the guide element 150 is shown being non-stretched.

However, when the second tower section 106 is to be lowered from the airship 100 to the first tower section 104, the guide element 150 may be stretched, possibly by the airship 100 flying upwards. The second tower section 106 is intended as an intermediate tower section of a wind turbine generator tower. Thus, the guide element 150 extends from the second intermediate tower section 106 to the first bottom tower section 104.

Figure 7:
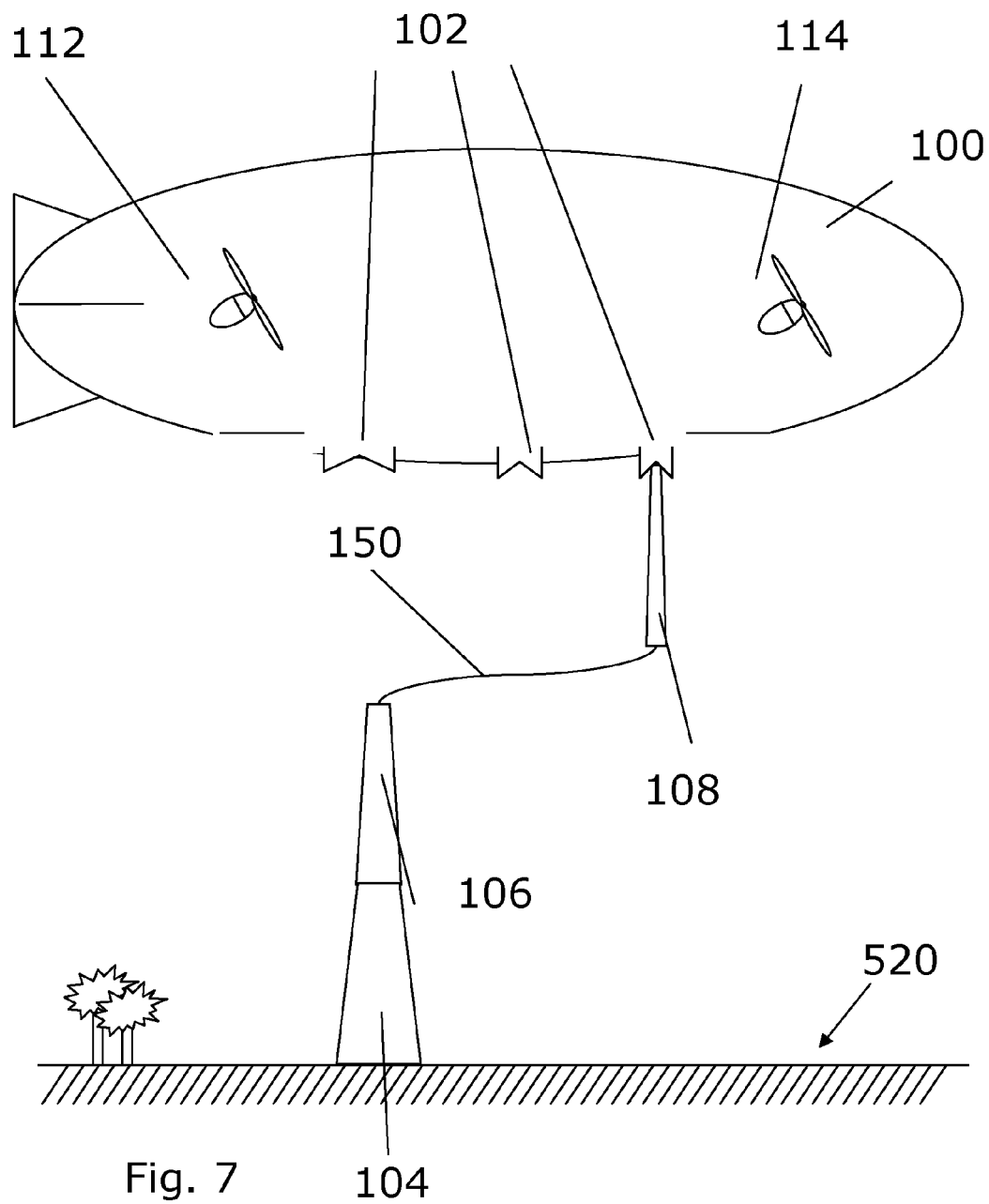

FIG. 7 shows the airship 100 after having unloaded the second tower section 106 at the site of installation and still having the third tower section 108 suspended in an attachment element 102.

A guide element 150 extends from the third tower section 108 to the second tower section 106 already installed at the site.

Regardless of the embodiment, the guide element 150 is intended for guiding the third tower section 108 from the airship 100 to the second tower section 106. The guide element 150 may be a flexible guide element 150 such as a wire, a rope, a chain or the like, or the guide element 150 may be a rigid element such as a rod or a lattice structure.

In the embodiment shown, the guide element 150 is shown being non-stretched.

However, when the third tower section 108 is to be lowered from the airship 100 to the second tower section 106, the guide element 150 will be stretched, e.g. by the airship 100 flying upwards. The third tower section 108 is intended as a top tower section of a wind turbine generator tower. Thus, the guide element 150 extends from the third top tower section 108 to the second intermediate tower section 106.

The guide element 150 shown in FIG. 7 may be the same guide element 150 as shown in FIG. 6, with 7 just showing another extension of the guide element 150, namely an extension between the second intermediate tower section 106 and the third top tower section 108. The guide element 150 shown in FIG. 7 may even be the same guide element 150 as shown in FIG. 5, with 7 just showing another extension of the guide element 150. Alternatively, the guide element 150 shown in FIG. 7 may be a separate guide element 150 that is similar to the guide element 150 in FIG. 5 and/or FIG. 6.

Figure 8:
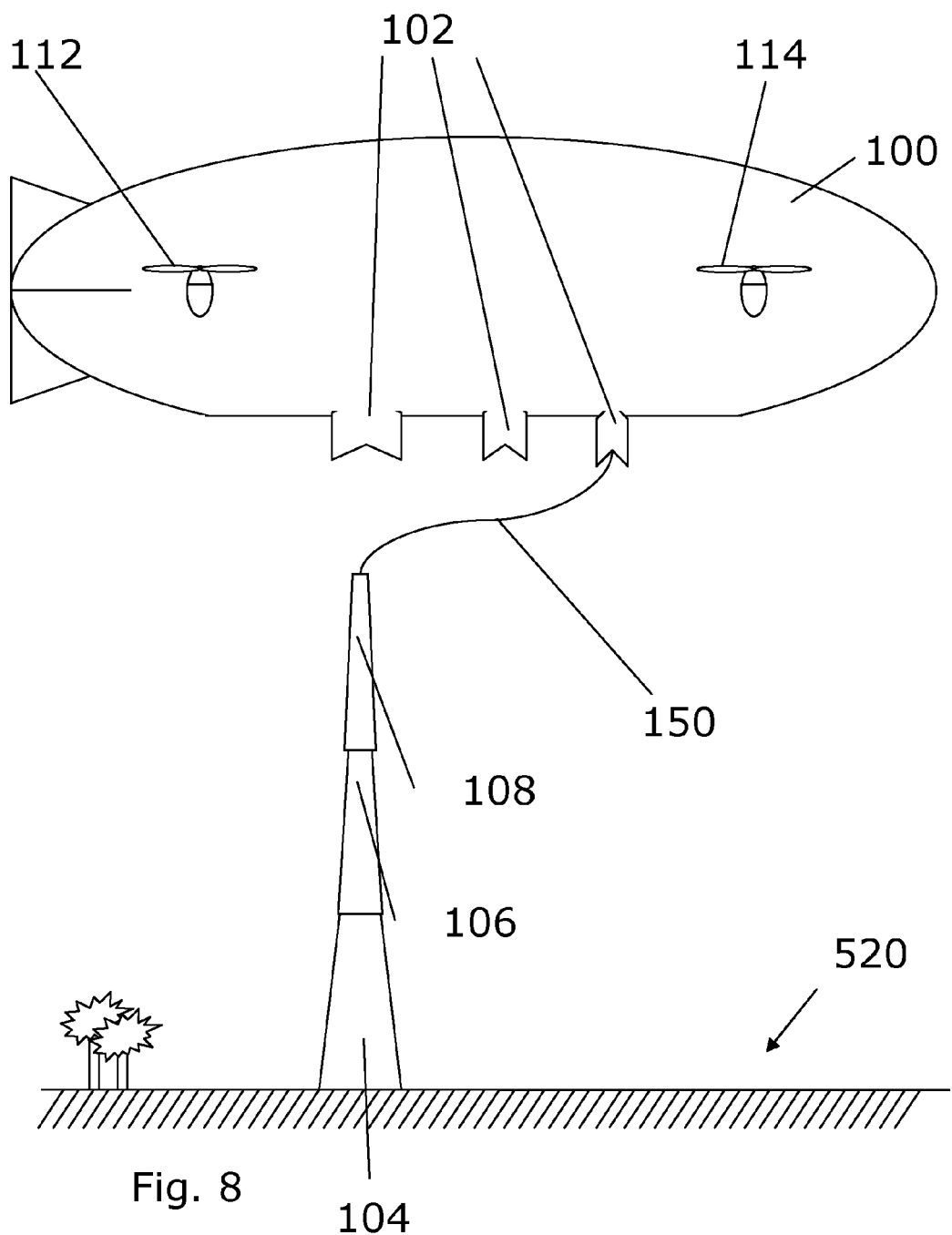

FIG. 8 shows the airship 100 after having unloaded also the third tower section 106 at the site of installation, thus now having unloaded the first, the second and the third tower sections 104, 106, 108.

A guide element 150 extends from the airship 100 to the third tower section 108 already installed at the site. The guide element 150 may be a flexible guide element 150 such as a wire, a rope, a chain or the like, or the guide element 150 may be a rigid element such as a rod or a lattice structure.

The guide element 150 shown in FIG. 8 may be the same guide element 150 as shown in FIG. 7, with FIG. 8 just showing another extension of the guide element 150, namely an extension between the third top tower section 108 and the airship 100. The guide element 150 shown in FIG. 8 may even be the same guide element 150 as shown in FIG. 6, with FIG. 8 just showing another extension of the guide element 150. The guide element 150 shown in FIG. 8 may even also be the same guide element 150 as shown in FIG. 5, with FIG. 8 just showing another extension of the guide element 150. Alternatively, the guide element 150 shown in FIG. 8 may be a separate guide element 150 that is similar to any of the above-described guide elements 150.

The airship may be maintained in position above the site of installation when unloading the wind turbine tower sections either by means of the one or more guide elements 150 shown, or by means of additional guide elements 150 extending from the airship 100 directly to the ground 520 at the site of installation.

In FIGS. 6-8 the airship is shown in the same position above the wind turbine tower sections for illustrative purposes only. In practice the airship will preferably be moved horizontally so that the wind turbine tower sections are to be moved vertically only during unloading. Hereby a more stable guiding can be obtained.

Figure 9:
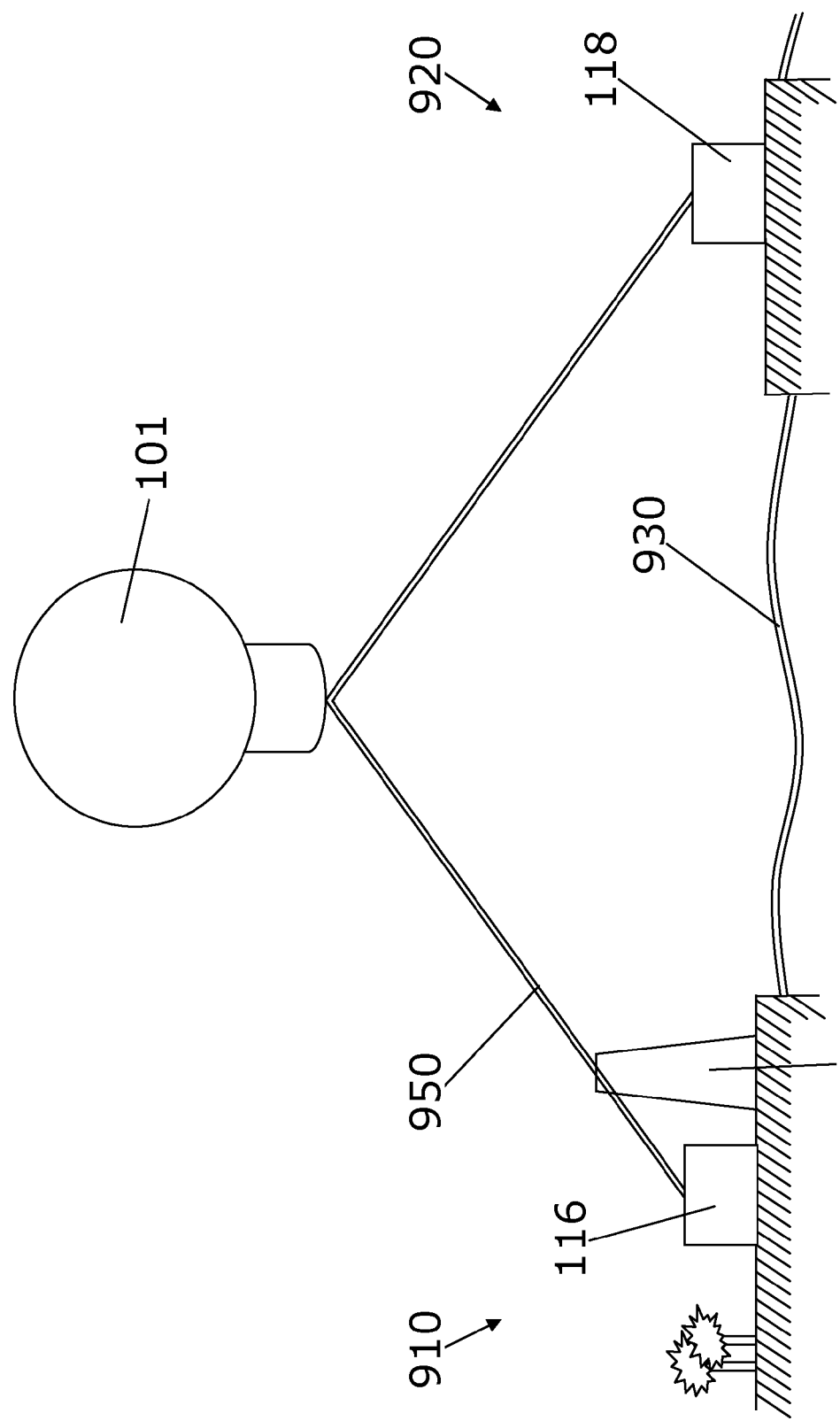
FIGS. 9-14 schematically show two examples of transportation along guide elements suspended between a site of loading and a site of installation of the wind turbine generator component; the guide elements are suspended by using a lighter-than-air vessel.
Figure 10:
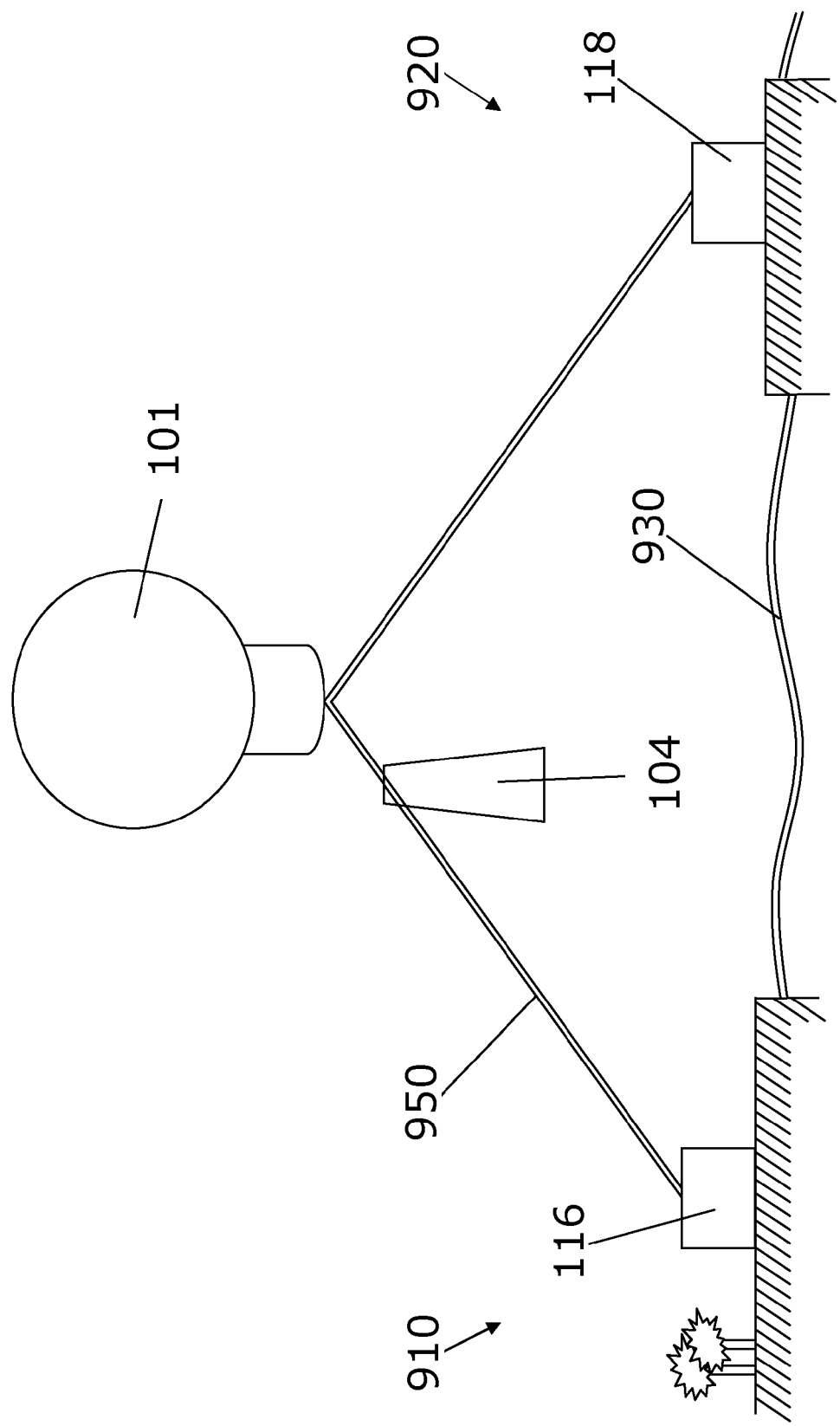
Figure 11:
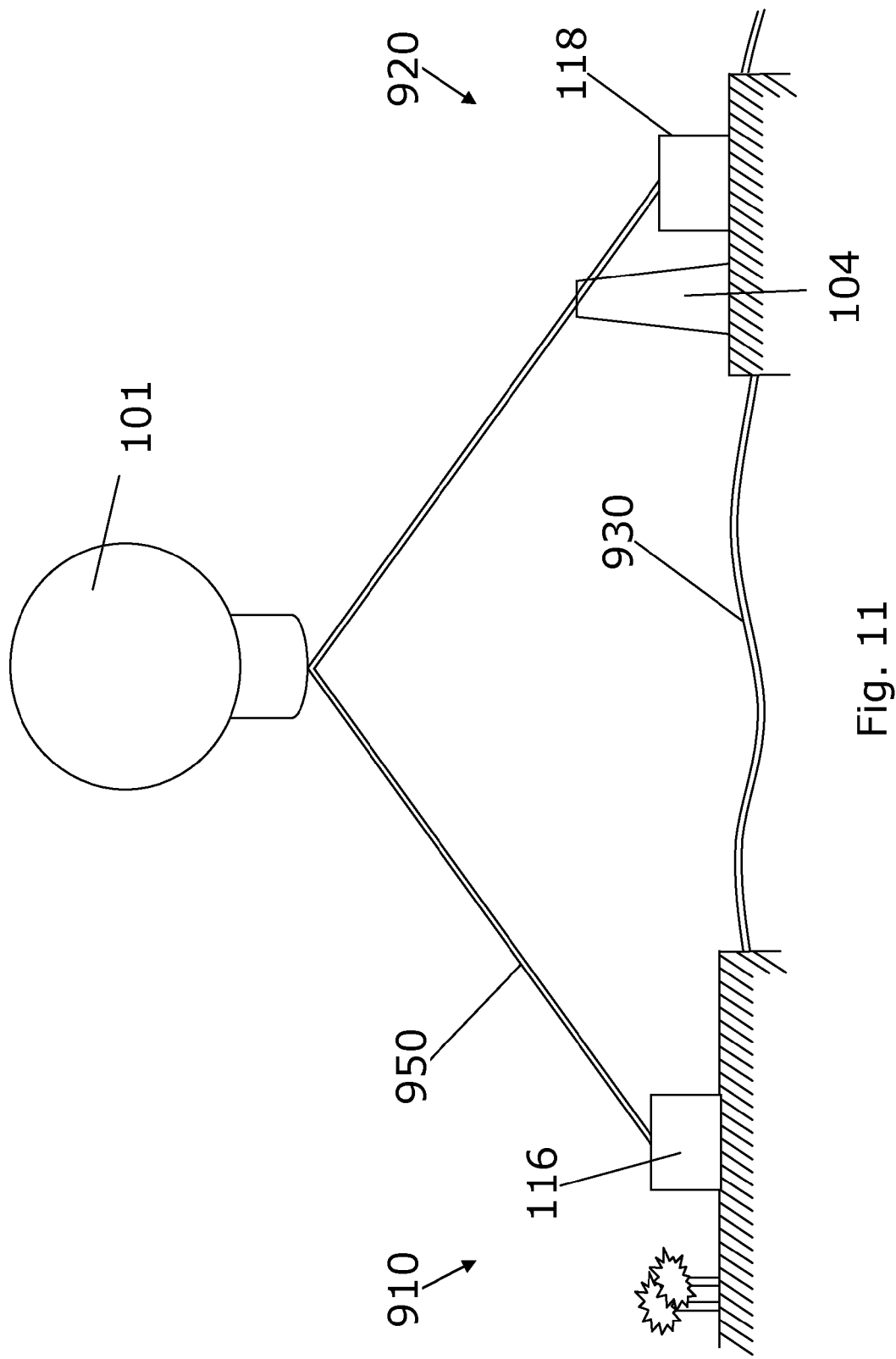

FIGS. 9-11 schematically show another embodiment of a method according to the invention comprising use of a lighter-than-air vessel 101 for handling at least one wind turbine generator component 104. In these figures, the wind turbine generator component 104 is moved over sea 930 to e.g. a foundation for a wind turbine generator. The same method may also be used e.g. to move wind turbine generator components 104 into a mountain area which is hard to access by traditional means of transportation.

As shown in FIG. 9, a guide element 950 is extended between a site of loading 910 a wind turbine generator component 104 and the site of installation 920 of a wind turbine generator component 104. In both ends it is anchored by use of anchoring means 116, 118 by any suitable method which will be well known to a person skilled in the art. The guide element 150 is suspended between the site of loading 910 and the site of installation 920 by a lighter-than-air vessel 101. In FIG. 9 the wind turbine generator component 104 is ready for loading, and in FIG. 10 it is being transported along the guide element 150 by any suitable means which will be well known to a person skilled in the art. At the site of unloading 920, the wind turbine generator component 104 is unloaded from the guide element 150 as shown in FIG. 11.

Figure 12:
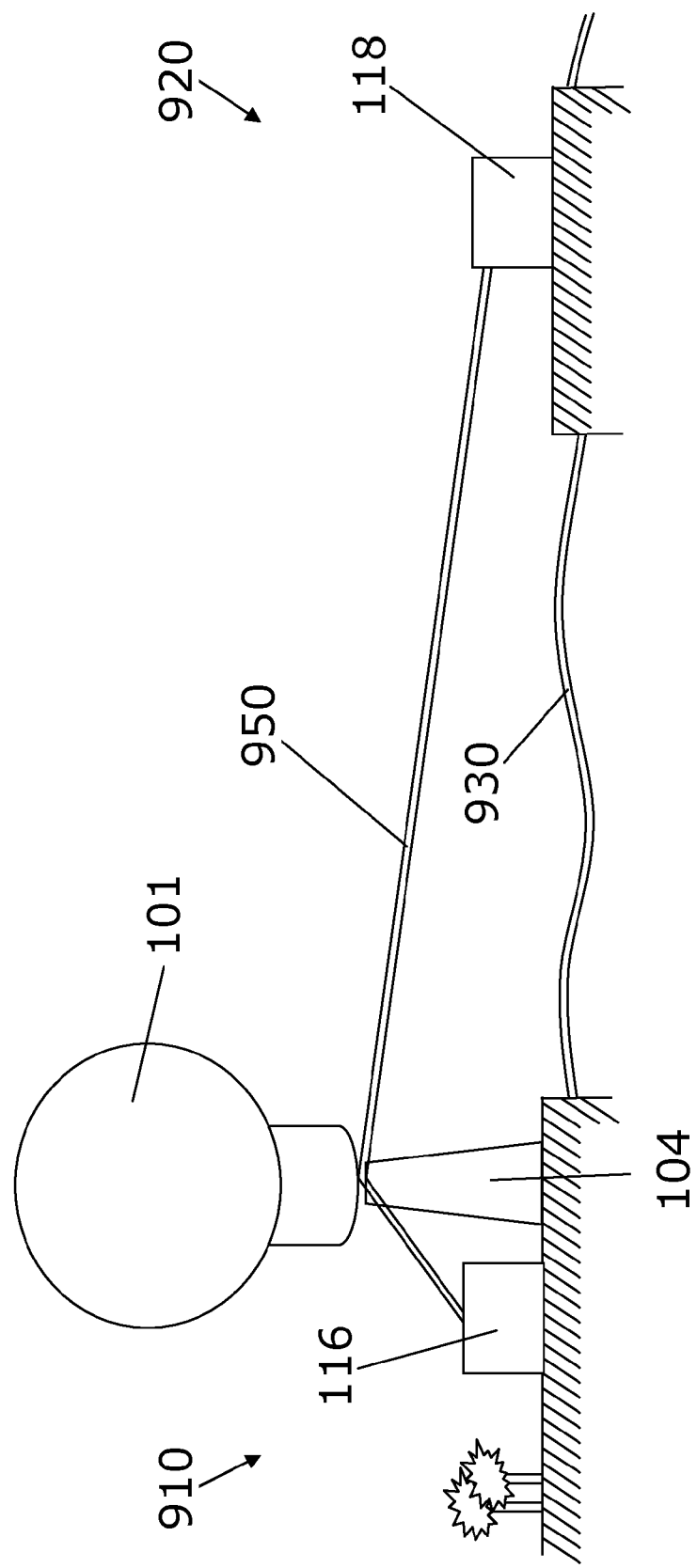
Figure 13:
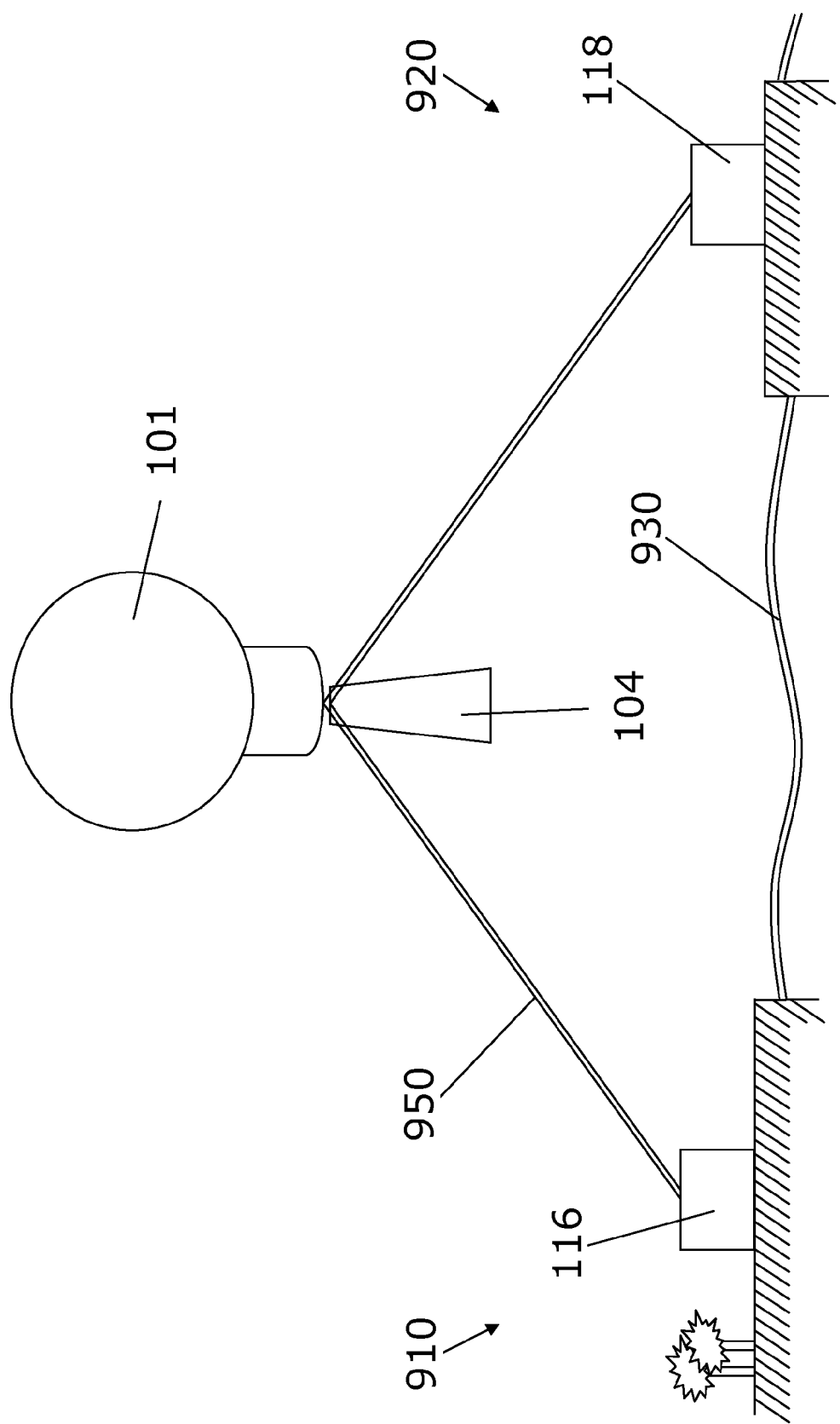
Figure 14:
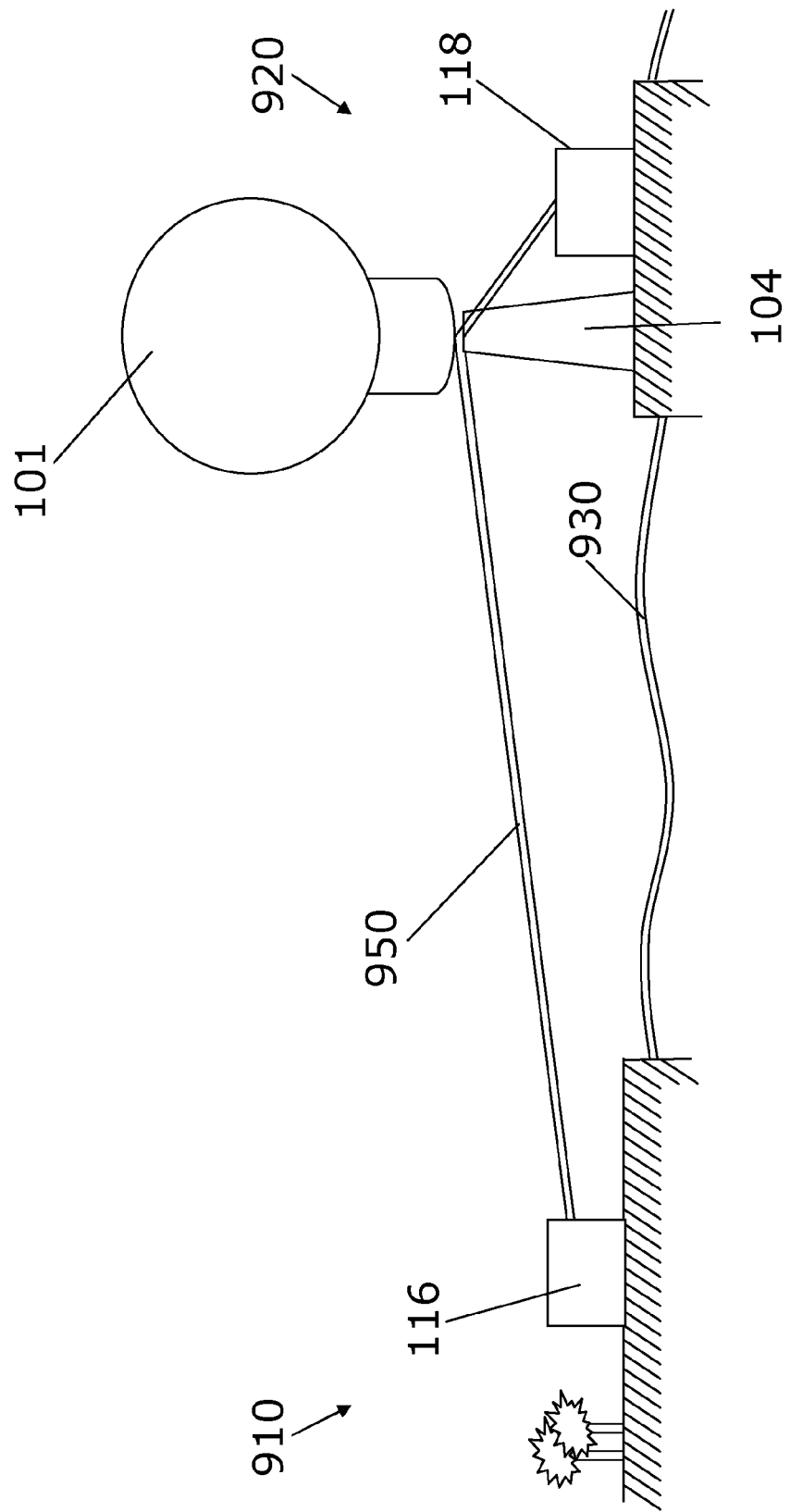

In FIGS. 9-11, the lighter-than-air vessel is kept substantially at the same position during the process of transportation. An alternative method is shown in FIGS. 12-14, wherein the lighter-than-air vessel 101 is moved along the guide element 150 together with the wind turbine generator component 104. An advantage of this alternative is that the wind turbine component 104 can be lifted directly by the lighter-than-air vessel 101, which may give a more stable transportation especially over long distances or in windy areas.

Figure 15:
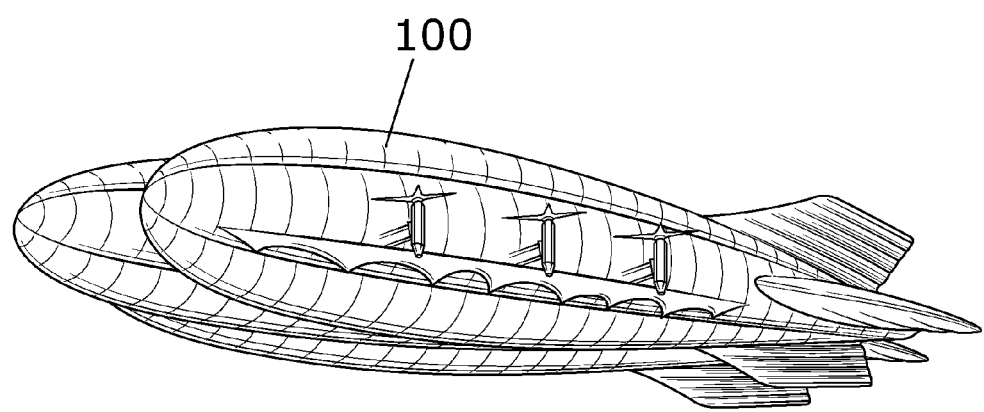
FIG. 15 shows a possible embodiment of an airship as shown schematically in FIGS. 1-8.

Different specific designs of an airship as shown schematically in the figures mentioned above will be appreciated by a person skilled in the art. FIG. 15 shows an example of such a possible specific embodiment.

As mentioned above, the present description is focused on the handling of wind turbine tower components exemplified by wind turbine tower sections. However, a method according to the invention can also be used for handling a range of pieces of equipment for installing a wind turbine generator, such as substations and the like for delivering electrical power from the wind turbine generator, or equipment such as cranes and the like for installing or servicing the wind turbine generator. The method can also be used for handling a complete wind turbine generator, so that use to the wording "wind turbine generator component" in this case is to be interpreted more broadly.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for handling at least one wind turbine generator component, said method comprising the steps of:
   loading said at least one wind turbine generator component to an airship at a site of loading, said site of loading being different from a site of unloading of the wind turbine generator component,
   transporting the airship with the at least one wind turbine component loaded thereto from the site of loading to the site of unloading, and unloading said at least one wind turbine generator component from the airship at the site of unloading by a connecting one end of a guide element to the airship, extending the guide element from the airship to an installation site at the site of unloading, connecting the other end of the guide element to the installation site, connecting the at least one wind turbine generator component to the guide element for movement of the at least one wind turbine generator component along the guide element, and lowering the at least one wind turbine generator component from the airship, the guide element guiding the at least one wind turbine generator component to the installation site.

2. The method according to claim 1, further comprising the step of initially selecting the at least one wind turbine generator component from the group consisting of the following components: a wind turbine blade, a wind turbine tower section, a complete wind turbine tower, a wind turbine nacelle, a wind turbine hub, a wind turbine foundation, a generator, a wind turbine gear box, a wind turbine transformer, a wind turbine rectifier, a wind turbine inverter, or a wind turbine bunny comprised of the hub and two wind turbine blades extending obliquely upwards.

3. The method according to claim 2, further comprising the step of subsequently selecting another wind turbine generator component, to be guided from the airship to the initially selected wind turbine generator component, from the group consisting of the following components: a wind turbine blade, a wind turbine tower section, a complete wind turbine tower, a wind turbine nacelle, a wind turbine hub, a wind turbine foundation, a generator, a wind turbine gear box, a wind turbine transformer, a wind turbine rectifier, a wind turbine inverter, a wind turbine bunny comprised of the hub and two wind turbine blades extending obliquely upwards, or a foundation.

4. The method according to claim 3, further comprising the steps of:
extending the guide element from a bottom of the airship,
further extending the guide element to a top of the subsequently selected wind turbine generator component,
even further extending the guide element to a bottom of the subsequently selected wind turbine generator component, and
still further extending the guide element to the initially selected wind turbine generator component.

5. The method according to claim 1, wherein the installation site is selected from a group consisting of a wind turbine foundation, a wind turbine tower section, a complete wind turbine tower, a wind turbine nacelle, a wind turbine hub, a wind turbine blade, a generator, a wind turbine gear box, a wind turbine transformer, a wind turbine rectifier, a wind turbine inverter, and a wind turbine bunny comprised of the hub and two wind turbine blades extending obliquely upwards.

6. The method according to claim 1, where the method further comprises the steps of initially unloading and installing one wind turbine tower section and subsequently guiding, by the guide element, another wind turbine tower section for said other wind turbine tower section to be positioned in relation to and to be installed on said one wind turbine tower section.

7. The method according to claim 1, further comprising the step of selecting the guide element from the group consisting of: one or more flexible ropes, one or more elastic ropes, one or more chains, one or more wires, or one or more rigid rods.

8. The method according to claim 1, further comprising the step of extending the guide element from or through eyelets provided at the airship and/or at the at least one wind turbine generator component and/or at the installation site.

* * * * *

UNITED STATES PATENT AND TRADEMARK OFFICE
CERTIFICATE OF CORRECTION

| | | |
|---|---|---|
| PATENT NO. | : 9,022,315 B2 | Page 1 of 1 |
| APPLICATION NO. | : 13/377380 | |
| DATED | : May 5, 2015 | |
| INVENTOR(S) | : Rune Kirt et al. | |

It is certified that error appears in the above-identified patent and that said Letters Patent is hereby corrected as shown below:

In the Claims:

At column 13, claim number 1, line number 2, after "by" delete "a"

Signed and Sealed this
Twenty-fourth Day of November, 2015

Michelle K. Lee
*Director of the United States Patent and Trademark Office*